April 23, 1957   L. HUTH   2,789,782
SMALL ARTICLE HOLDING CLIP
Filed June 2, 1953
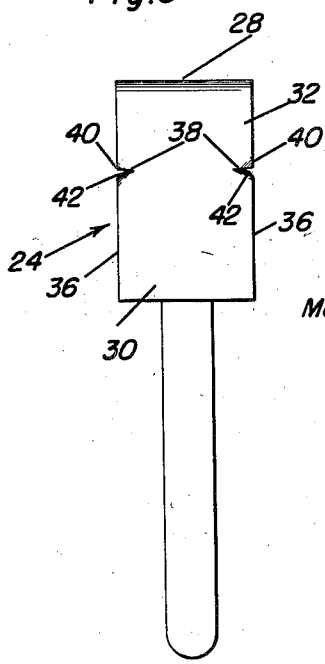
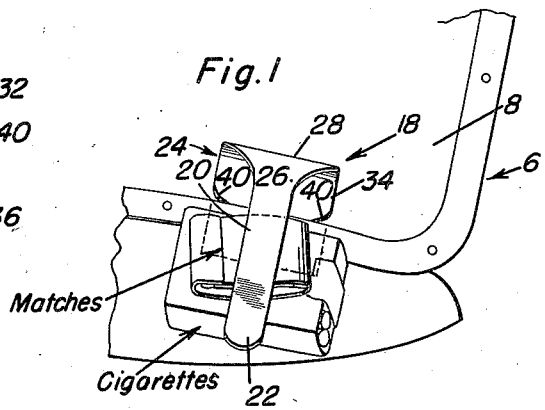
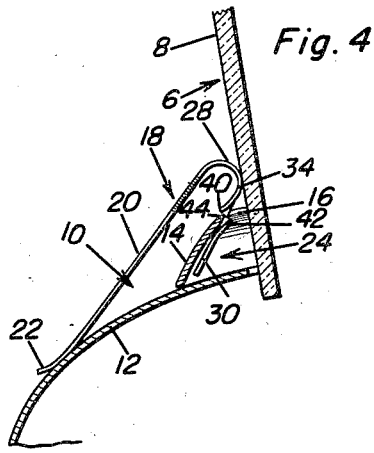
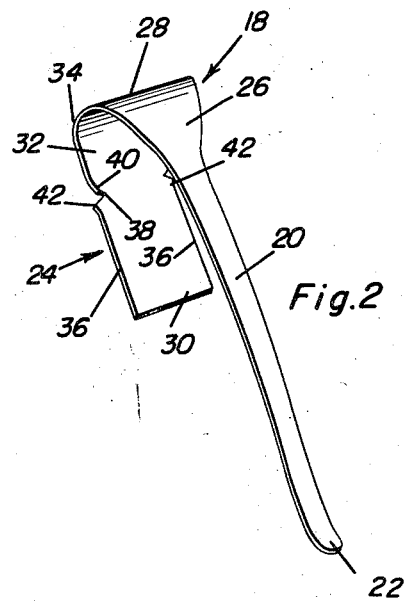
Ludwig Huth
INVENTOR.

United States Patent Office 2,789,782
Patented Apr. 23, 1957

2,789,782

SMALL ARTICLE HOLDING CLIP

Ludwig Huth, Elmhurst, N. Y.

Application June 2, 1953, Serial No. 359,098

1 Claim. (Cl. 248—216)

The present invention relates to special clasps or so-called spring clips used for clamping and retaining miscellaneous small articles in a handy and convenient place for accessible use and the object of the invention is to provide a specially constructed clip for use in automobile and equivalent vehicles, such clip being unique in that it lends itself to proper and satisfactory use on a windshield cowl.

In carrying out the principles of the invention a clip is provided for companion use with the windshield on the cowl so that the cowl serves as a base or support surface for small articles and implements such as sheets of paper, bills, maps, match folders, cigarette packages, pencils and the like, said clip being characterized by a resilient hold-down finger or leg which yieldingly clamps and holds the selected article in place.

One phase of the over-all concept has to do with the stated parts in combination, more specifically, an upstanding windshield and an associated cowl which slopes and curves downwardly and rearwardly and which has a defroster slot in close spaced parallelism relative to the adjacent inner surface of the windshield, and a complemental attachable and detachable article clamping and hold-down clip, the latter having a tensioned spring clamping leg with a portion resting yieldingly against a predetermined surface of the cowl on one side of said slot, a companion anchoring leg fitting into and removably anchored in said slot, and a curvate bend joining said legs and resting firmly against said inner surface of the windshield.

Novelty is predicated on the above association of elements wherein said clip is generally U-shaped, the clamping leg being relatively long, slender and bowed lengthwise while the anchoring leg is short, wide, rigid and virtually flat, the bend which joins the leg being resilient and providing the desired spring connection.

Then, too, novelty resides in the provision on said anchoring leg of at least two oppositely arranged stop shoulders, these being adapted to abut the edge of the stated air slot, whereby to in this manner limit the downward descent or passage of the anchoring leg through the slot and to thus guard against accidental displacement of the clip from its place of vantage.

Other objects, features and advantages will become more readily apparent from the following description and the accompanying sheet of illustrative drawings.

In the drawings, wherein like numerals are employed to designate like parts throughout the views:

Figure 1 is a fragmentary perspective view showing a portion of the windshield and usual cowl with the improved clip in position and serving to hold a package of cigarettes and matches in a readily accessible position;

Figure 2 is a perspective view of the clip by itself;

Figure 3 is an elevational view observing the clip with the anchoring leg facing the reader; and, Figure 4 is a view in section and elevation of the windshield and cowl, the clip appearing in elevation, and said view showing the manner in which the clip is anchored and stabilized.

Referring now to the drawing with reference numerals and accompanying lead lines, reference is had first to Figures 1 and 3 wherein the numeral 6 denotes a windshield the inward surface of which is denoted at 8. The usual or conventional downwardly and rearwardly curving cowl is denoted by the numeral 10 and this comprises a curvate body portion 12 and the customary molding 14 in which the air slot or so-called defroster opening or slot 16 is provided. As customary this more or less parallels the inner surface and is in close proximity thereto.

The improved special purpose clip is denoted generally by the numeral 18. It is preferably constructed from suitable steel, from equivalent metal or some equivalent material having the desired rigid as well as resilient property. It is to be a relatively sturdy clip and while it is shown as constructed from a single piece of metal it is within the purview of the invention to construct the essential legs from different pieces of metal and to rivet or otherwise secure the same together. In any event the relatively long and slender clamping leg or finger is denoted at 20 and this has a laterally deflected free end portion 22. In approximate spaced parallelism with one end portion thereof is the anchoring leg 24. This is rigid, broad or wide, being some three times the width of the leg 20 and being considerably shorter in the approximate relation seen in the drawing. The upper end portion of the leg 20 is gradually widened at 26 where it merges into a U-bend the crest of which is denoted at 28. Thus, corresponding ends of the legs 20 and 24 are joined by this resilient spring or bend. The lower free end portion of the leg 20 as at 30 is adapted to pass downwardly through the vent or slot 16 to the extent shown in Figures 1 and 4. The upper half portion 32 is not intended to enter the slot and its function is to sort of cant the bend so that the portion 34 thereof rests firmly in contact with the surface 8 of the windshield. The intermediate portions of the vertical edges 36—36 are provided with opposed slits or notches denoted in Figures 2 and 3 in particular. The metal on opposite sides of the notches is flexed or deflectively bent in opposite direction to form elements 40—40 and 42—42. The upper elements are intended to function as stop shoulders in that they rest against the edge portion 44 of the air slot in the manner best shown in Figure 4. The essential part of the lower half portion 30 descends into and through the slot while the upper portion remains above the slot and the tension of the leg 20 bearing on the covex surface of the cowl 12 serves to tilt and bind the surface 34 of the bend against the windshield so that the windshield becomes a stabilizer for the clip. These special cooperating features prevent the clip from becoming displaced once it is put correctly in place. To install the clip all that is necessary is to hold it sideways guiding the anchoring leg into the slot and to then right or turn the clip in the proper direction so that the shoulders keep themselves against the edge of the slot in the manner shown.

The simplicity of the clip is such that when taken in conjunction with the drawing, its construction and views will be clearly apparent. Under the circumstances a more extended description seems not to be required.

From the foregoing, the construction and operation of the device will be readily understood and further explanation is believed to be unnecessary. However, since numerous modifications and changes will readily occur to those skilled in the art, is is not desired to limit the invention to the exact construction shown and described, and accordingly all suitable modifications and equivalents may be resorted to, falling within the scope of the appended claim.

What is claimed as new is as follows:

Means for basing and removably supporting miscellaneous small articles and implements, such as notes, maps, match folders, cigarette packs, pencils and so on, on a cowl inwardly of an upstanding windshield and wherein the cowl slopes and curves downwardly and rearwardly and has a defroster slot in close spaced parallelism relative to the adjacent inner surface of the windshield; an attachable and detachable article clamping and hold-down clip having a tensioned spring clamping leg with a free end portion adapted to press yieldingly against a selected surface of the cowl beyond and on one side of said slot, a companion anchoring leg intended and structurally designed to fit into and be removably anchored in said slot, a curvate bend joining the adjacent respective ends of said legs and shaped to rest firmly against the inner surface of the windshield, said clip being generally U-shaped, said clamping leg being relatively long, slender, and bowed lengthwise, said anchoring leg being short, wide, relatively rigid and essentially flat, and said bend being resilient, said anchoring leg having linearly straight parallel longitudinal edge portions, each edge portion having a slit formed therein parallel to said bend, said slits being situated a predetermined distance from the crest of said bend, located opposite each other and midway between the bend and free edge of said anchoring leg, the edge portions of the leg above and below each slit being alternately bent and providing oppositely disposed outstanding stop shoulders designed to abut at least one edge of the slot, whereby to serve as a fulcrum and to also limit the downward passage of said anchoring leg through said slot and to cause the crest of said bend to firmly abut the adjacent surface of said windshield.

References Cited in the file of this patent

UNITED STATES PATENTS

| | | |
|---|---|---|
| 674,414 | Holmes | May 21, 1901 |
| 884,055 | Varnadore | April 7, 1908 |
| 1,704,075 | Brown | Mar. 5, 1929 |
| 1,739,057 | Bock | Dec. 10, 1929 |
| 2,148,847 | Wiley | Feb. 28, 1939 |
| 2,150,489 | Fernberg | Mar. 14, 1939 |
| 2,208,722 | Doty | July 23, 1940 |
| 2,485,189 | Churchill | Oct. 18, 1949 |
| 2,494,980 | Zuckerman | Jan. 17, 1950 |
| 2,536,895 | West | Jan. 2, 1951 |
| 2,559,200 | Hooks | Apr. 17, 1951 |
| 2,658,248 | Kost | Nov. 10, 1953 |

FOREIGN PATENTS

| | | |
|---|---|---|
| 842,391 | Germany | of 1952 |